(12) United States Patent
Gresham

(10) Patent No.: US 8,141,852 B1
(45) Date of Patent: Mar. 27, 2012

(54) STRAP SECURING SYSTEM

(76) Inventor: Ronald E. Gresham, Fosston, MN (US)

( * ) Notice: Subject to any disclaimer, the term of this patent is extended or adjusted under 35 U.S.C. 154(b) by 228 days.

(21) Appl. No.: 12/708,157

(22) Filed: Feb. 18, 2010

(51) Int. Cl.
*B21F 9/00* (2006.01)

(52) U.S. Cl. .................. 254/225; 242/388.4; 24/71 ST

(58) Field of Classification Search ............... 254/217, 254/218, 225; 242/388, 388.1, 388.4; 24/68 R, 24/69 ST, 69 CT, 71 ST
See application file for complete search history.

(56) References Cited

U.S. PATENT DOCUMENTS

| | | | |
|---|---|---|---|
| 3,826,443 A | 7/1974 | Goodley | |
| 4,227,286 A | 10/1980 | Holmberg | |
| 4,266,740 A * | 5/1981 | Ramos et al. | 242/532.6 |
| 4,301,977 A | 11/1981 | Young | |
| 4,311,288 A * | 1/1982 | Galland | 242/532.6 |
| 4,390,141 A | 6/1983 | Webster | |
| 4,463,911 A | 8/1984 | Beach | |
| 4,913,608 A * | 4/1990 | Royball | 410/103 |
| 5,033,690 A * | 7/1991 | McIver | 242/532.6 |
| 5,103,536 A * | 4/1992 | Kamper | 24/68 CD |
| 5,271,606 A * | 12/1993 | Kamper | 254/217 |
| D402,539 S | 12/1998 | Pingel | |
| 5,993,127 A * | 11/1999 | Shinn | 410/100 |
| 6,332,586 B1 * | 12/2001 | Risa et al. | 242/530.2 |
| 6,547,218 B2 * | 4/2003 | Landy | 254/217 |
| 7,004,422 B1 | 2/2006 | Chen | |
| 7,107,655 B1 * | 9/2006 | Huang | 24/68 CD |
| 7,231,693 B2 * | 6/2007 | Wilcox et al. | 24/68 R |
| 7,475,869 B2 * | 1/2009 | Dennis | 256/42 |
| 7,690,481 B1 * | 4/2010 | Pederson | 182/133 |
| 7,766,271 B1 * | 8/2010 | Confoey | 242/395 |
| 7,877,846 B1 * | 2/2011 | Chen et al. | 24/68 CD |
| 2008/0034557 A1 | 2/2008 | Taylor | |

* cited by examiner

*Primary Examiner* — Emmanu M Marcelo
(74) *Attorney, Agent, or Firm* — Neustel Law Offices

(57) ABSTRACT

A strap securing system for preventing damage and tangling caused by the flapping of excess strap material when using a ratchet strap. The strap securing system generally includes a frame which includes a first strap slot for receiving a secured strap portion. A securing member will generally be rotatably attached to the frame. The securing member will preferably include a second strap slot positioned therein for receiving an excess strap portion. A crank member will generally be fixedly attached to the securing member for providing rotational force to the securing member. By rotating the securing member in a first direction with the crank member, the excess strap portion which has been inserted within the second strap slot will be wound around the securing member, thus preventing it from flapping around and causing damage or becoming tangled.

1 Claim, 9 Drawing Sheets

STRAP SECURING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a system for securing excess strap material and more specifically it relates to a strap securing system for preventing damage and tangling caused by the flapping of excess strap material when using a ratchet strap.

2. Description of the Related Art

Any discussion of the related art throughout the specification should in no way be considered as an admission that such related art is widely known or forms part of common general knowledge in the field.

Ratchet straps and fasteners (also commonly referred to as "tie-down straps") have been in use for years. Ratchet fasteners are generally used for securing cargo to a trailer or other structure during transportation of the cargo. A ratchet strap is positioned around the cargo and then fed through the ratchet fastener, which acts to tighten the strap around the cargo.

When using ratchet straps, it is common for a length of excess strap to extend from the ratchet fastener. This excess strap will often flap in the wind while the cargo is being transported. The excess strap can cause damage to the load due to the strap flapping around and hitting the cargo. Further, the strap itself can become damaged and/or frayed through repeated flapping against the cargo or another structure. In the past, the excess strap has been secured utilizing duct tape or other fasteners.

Because of the inherent problems with the related art, there is a need for a new and improved strap securing system for preventing damage and tangling caused by the flapping of excess strap material when using a ratchet strap.

BRIEF SUMMARY OF THE INVENTION

A system for preventing damage and tangling caused by the flapping of excess strap material when using a ratchet strap. The invention generally relates to a strap securing system which includes a frame having a first strap slot for receiving a secured strap portion. A securing member will generally be rotatably attached to the frame. The securing member will preferably include a second strap slot positioned therein for receiving an excess strap portion. A crank member will generally be fixedly attached to the securing member for providing rotational force to the securing member. By rotating the securing member in a first direction with the crank member, the excess strap portion which has been inserted within the second strap slot will be wound around the securing member, thus preventing it from flapping around and causing damage or becoming tangled.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
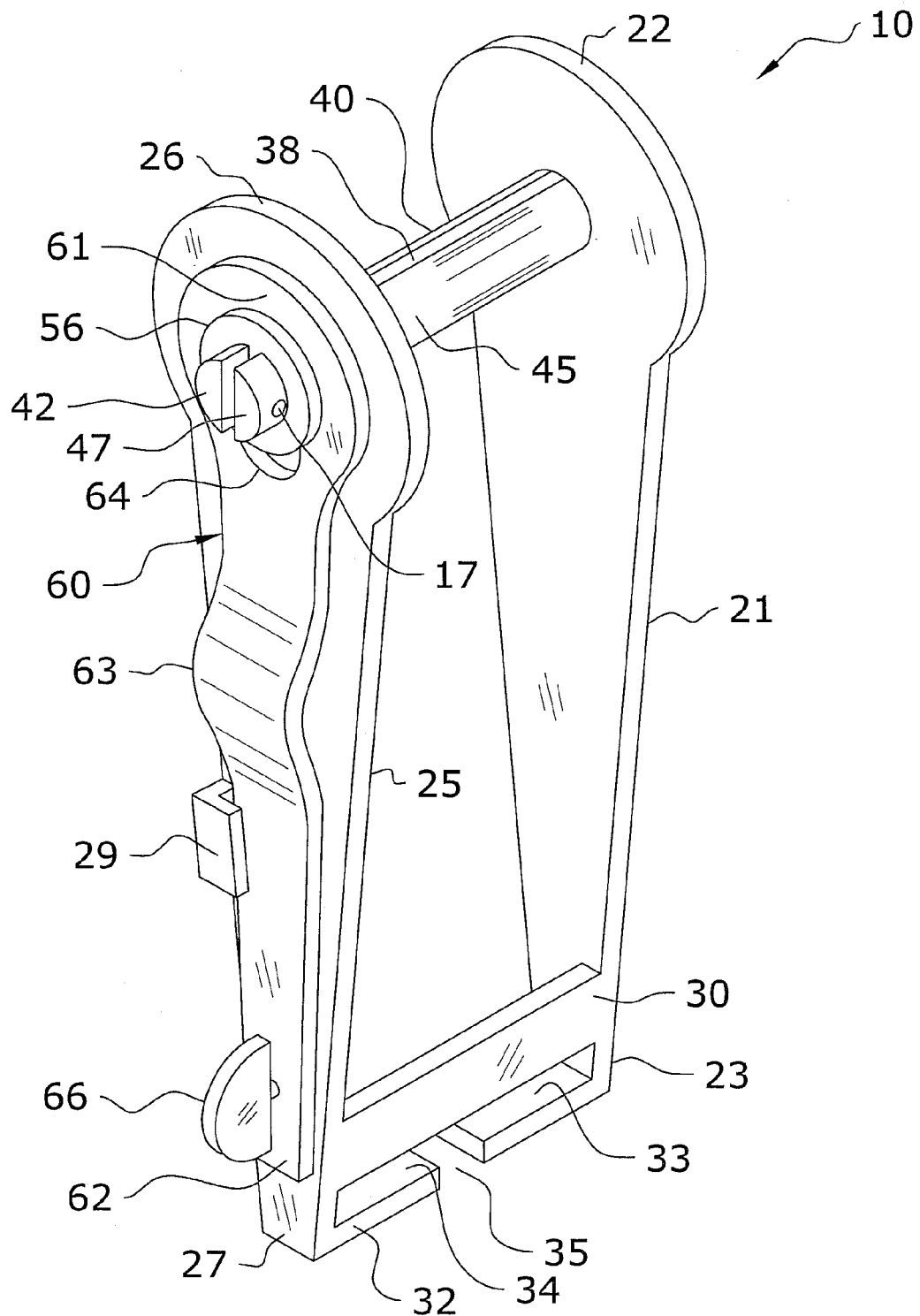
FIG. 1 is an upper perspective view of the present invention.

Turning now descriptively to the drawings, in which similar reference characters denote similar elements throughout the several views, FIGS. 1 through 9 illustrate a strap securing system 10, which comprises a frame 20 which includes a first strap slot 31 for receiving a secured strap portion 12. A securing member 40, 45 will generally be rotatably attached to the frame 20. The securing member 40, 45 will preferably include a second strap slot 38 positioned therein for receiving an excess strap portion 14. A crank member 60 will generally be fixedly attached to the securing member 40, 45 for providing rotational force to the securing member 40, 45. By rotating the securing member 40, 45 in a first direction with the crank member 60, the excess strap portion 14 which has been inserted within the second strap slot 38 will be wound around the securing member 40, 45, thus preventing the excess strap portion 14 from flapping around and causing damage or becoming tangled.

B. Frame

The present invention will generally include a frame 20 for winding up and securing an excess strap portion 14 extending from a ratchet fastener 11. The frame 20 will generally include a first member 21 and a second member 25. The first member 21 and second member 25 will generally extend parallel to each other and be comprised of substantially the same structure. In a preferred embodiment, the first member 21 and second member 25 will each be comprised of an elongated member having a rounded upper end 22, 26 as shown in FIG. 1.

The first member 21 will generally include an upper end 22 and a lower end 23. The first member 21 will generally be comprised of an elongated member which is tapered from its upper end 22 to its lower end 23 as shown in FIG. 1. The first member 21 may also include a rounded upper end 22. The upper end 22 of the first member 21 will preferably include a first opening 24 through which the securing members 40, 45 of the present invention will extend when assembled.

In a preferred embodiment, the lower end 23 of the first member 21 will be of a first width and the upper end 22 of the first member 21 will be of a second width, wherein the first width is less than the second width. However, it is appreciated that various other configurations and designs may be utilized without affecting the overall operation of the present invention.

The second member 25 will generally mirror the first member 21 and be positioned parallel to the first member 21 in the frame 20 as shown in FIG. 1. The second member 25 will generally include an upper end 26 and a lower end 27. The second member 25 will also generally be comprised of an elongated member which is tapered from its upper end 26 to its lower end 27. The second member may also include a rounded upper end 26. The upper end 26 of the second member 25 will preferably include a second opening 28 through which the securing members 40, 45 of the present invention will extend when assembled. The second opening 28 of the second member 25 will preferably be aligned with the first opening 24 of the first member 21 so as to allow the securing members 40, 45 to extend in a straight alignment through both openings 24, 28.

In a preferred embodiment, the lower end 27 of the second member 25 will be of a first width and the upper end 26 of the second member 25 will be of a second width, wherein the first width is less than the second width. However, it is appreciated that various other configurations and designs may be utilized for the second member 25 without affecting the overall operation of the present invention.

Figure 2:
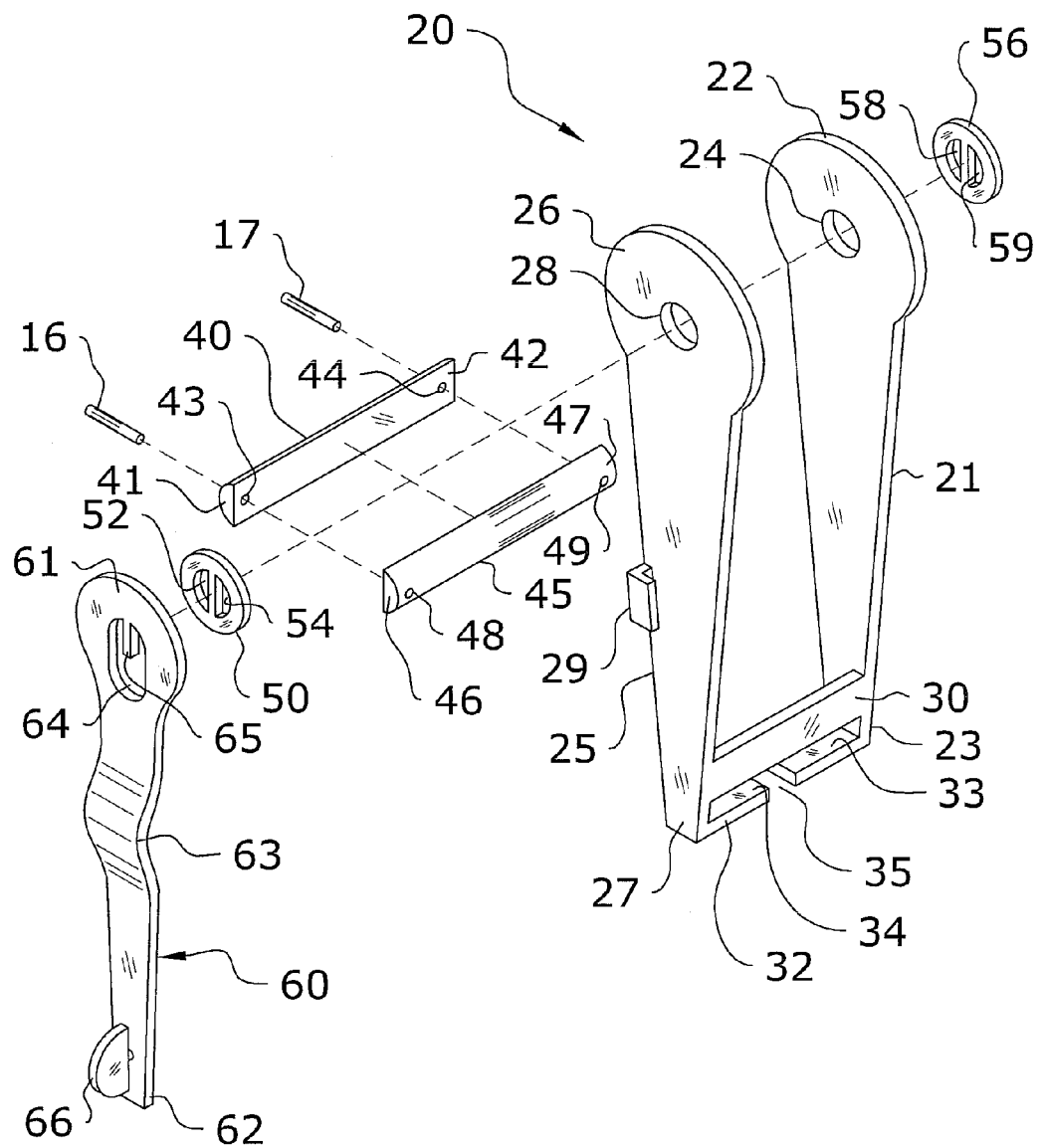
FIG. 2 is an exploded upper perspective view of the present invention.
Figure 3:
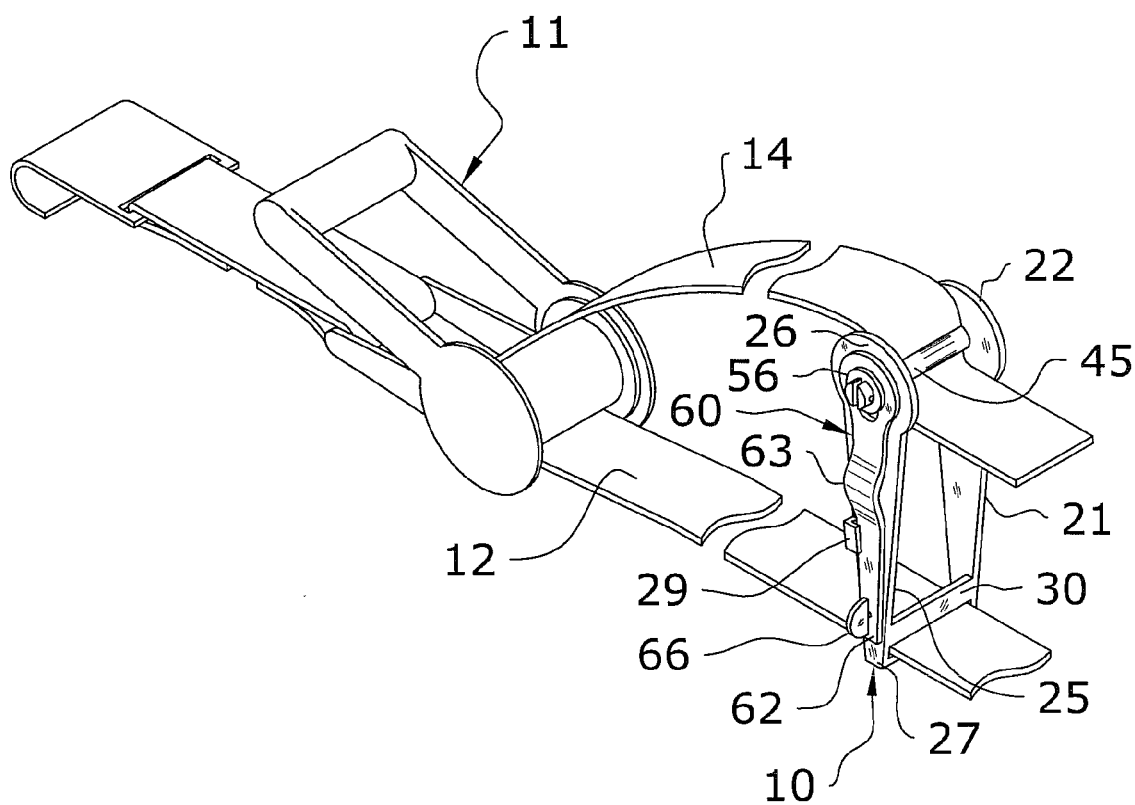
FIG. 3 is an upper perspective view of the present invention in use.

The second member 25 of the frame 20 will also generally include a catch member 29 against which the crank member 60 of the present invention may be rested when using the present invention. The catch member 29 will generally be comprised of a rectangular projection facing outward from one edge of the second member 25 as shown in FIG. 2. The catch member 29 may be positioned at various locations along the length of the second member 25, but in a preferred embodiment will be positioned at the approximate halfway point between the upper end 26 and lower end 27 of the second member 25. In some embodiments, the catch member 29 may be integrally formed with the second member 25. It is also appreciated that, in some embodiments, the catch member 29 may be positioned on the first member 21 of the body.

The frame 20 will generally include a first connecting member 30 and second connecting member 32 both extending from the first member 21 to the second member 25 and including a first strap slot 31 defined therebetween as shown in FIG. 1.

The first connecting member 30 will generally be comprised of an elongated member which extends from the first member 21 to the second member 25. The first connecting member 30 may be located at various locations on the first member 21 and the second member 25, but will preferably extend from a point on the first member 21 which is above its lower end 23 to a point on the second member 25 which is above its lower end 27, as shown in FIG. 2. The first connecting member 30 will generally extend in a perpendicular direction with respect to both the first member 21 and the second member 25. It is also appreciated that, in some embodiments, the first connecting member 30 may be integrally formed with the first member 21 and/or the second member 25 of the frame 20.

The second connecting member 32 will generally be comprised of an elongated member which extends from the first member 21 to the second member 25 of the frame 20. The second connecting member 32 may be positioned at various locations on the first member 21 and the second member 25, but will preferably extend from the lower end 23 of the first member 21 to the lower end 27 of the second member 25 as shown in FIG. 2.

The second connecting member 32 will generally extend in a parallel direction with respect to the first connecting member 25. Further, the second connecting member 32 will generally extend across the members 21, 25 of the frame 20 at a slight distance away from the first connecting member 25. It is appreciated that the second connecting member 32 may be positioned at various other locations, so long as its positioning with respect to the first connecting member 30 creates a first strap slot 31 through which a secured strap portion 12 may be inserted. It is also appreciated that, in some embodiments, the second connecting member 32 may be integrally formed with the first member 21 and/or second member 25 of the frame 20.

Although the second connecting member 32 may be comprised of various designs and configurations, a preferred embodiment will include a first portion 33 and a second portion 34 separated by a gap 35 as shown in FIG. 1. In such an embodiment, the second connecting member 32 is comprised of a pair of elongated members which each extend toward each other in a direction parallel to the first connecting member 30 and are separated by a short gap 35. The secured strap portion 12 utilized with the present invention will generally not include a free end. When using the present invention, the secured strap portion 12 will generally be extended through the gap 35 to reach and be secured within the first strap slot 31.

C. Securing Members

Figure 4:
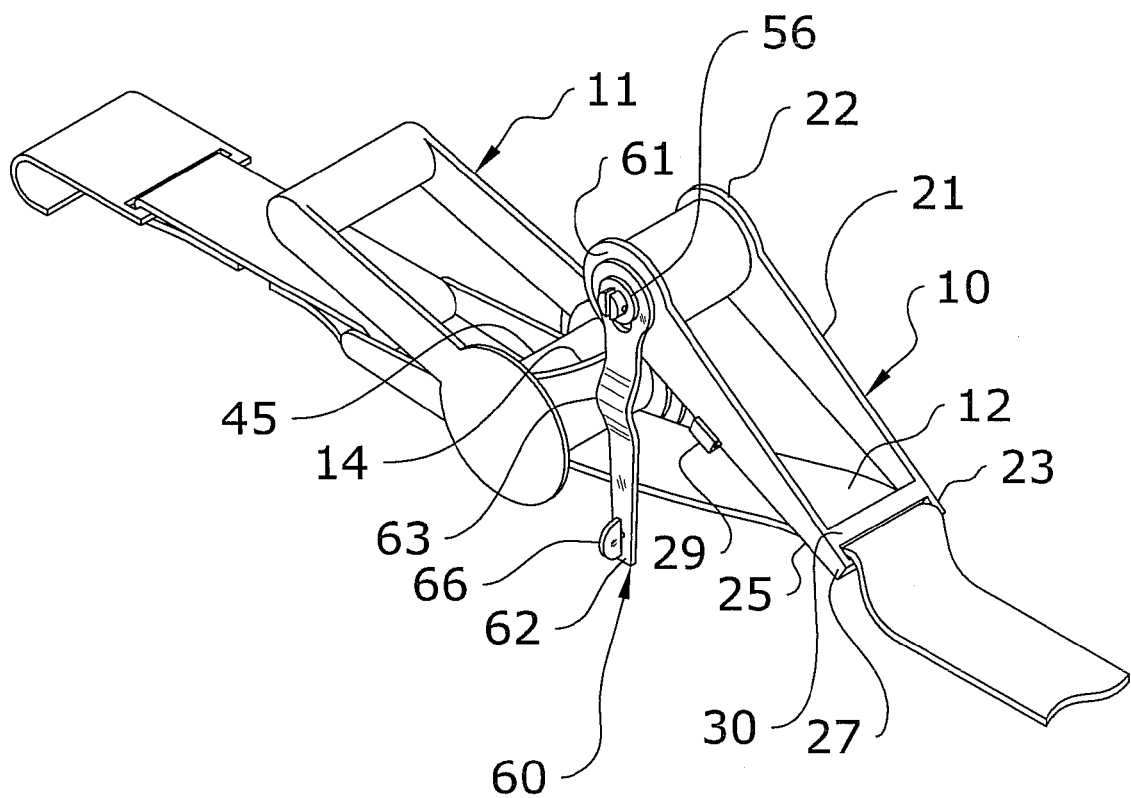
FIG. 4 is an upper perspective view of the present invention in use.

The present invention will generally include a first securing member 40 and a second securing member 45 which both extend from the first member 21 to the second member 25 of the frame 20 so as to form a second strap slot 38 therebetween as shown in FIG. 1. The securing members 40, 45 will preferably be rotatably positioned within the openings 24, 28 of the frame 20 and fixedly attached at one end to a crank member 60. When the present invention is in use, the excess strap portion 14 will be inserted into the second strap slot 38 and wound around the securing members 40, 45 through use of the crank member 60 as shown in FIG. 4.

The first securing member 40 will generally be comprised of an elongated member having a first end 41 and a second end 42 as shown in FIG. 2. The first securing member 40 may be comprised of various configurations, but will preferably be comprised of an elongated member having a substantially D-shaped cross-section as shown in FIG. 2. Although the first securing member 40 may be alternatively configured, it is preferable that the first securing member 40 include a flat face on the edge which will face in the direction of the second securing member 45 to create a secure second strap slot 38 between the first securing member 40 and second securing member 45.

The first securing member 40 will generally include a first aperture 43 positioned adjacent its first end 41 and a second aperture 44 positioned adjacent its second end 42. The first end 41 of the first securing member 40 will generally extend through both the first opening 24 of the first member 21 and the first opening 52 of the first locking member 50. The second end 42 of the first securing member 40 will generally extend through the second opening 28 of the second member 25, the first opening 58 of the second locking member 56 and the opening 64 of the crank member 60 when the present invention is assembled.

The second securing member 45 will generally be comprised of an elongated member having a first end 46 and a second end 47 as shown in FIG. 2. The second securing member 45 may be comprised of various configurations, but will preferably be comprised of an elongated member having a substantially D-shaped cross-section as shown in FIG. 2. Although the second securing member 45 may be alternatively configured, it is preferable that the second securing member 45 include a flat face on the edge which will face in the direction of the first securing member 40. The respective flat faces of the first securing member 40 and second securing member 45 will generally face each other so as to create a secure second strap slot 38 when the present invention is assembled.

The second securing member 45 will generally include a first aperture 48 positioned adjacent its first end 46 and a second aperture 49 positioned adjacent its second end 47. The first end 46 of the second securing member 45 will generally extend through both the first opening 24 of the first member 21 and the second opening 54 of the first locking member 50. The second end 47 of the second securing member 45 will generally extend through the second opening 28 of the second member 25, the second opening 59 of the second locking member 56 and the opening 64 of the crank member 60 when the present invention is assembled.

After being inserted through the frame 20, locking members 50, 56 and crank member 60 of the present invention, the securing members 40, 45 will generally be secured to each other and in place by a pair of fasteners 16, 17. The first fastener 16 will generally act to secure the first locking member 50 against the first member 21 of the frame 20. The second fastener 17 will generally act to secure the second locking member 56 and crank member 60 against the second member 25 of the frame 20. The fasteners 16, 17 of the present invention may be comprised of various configurations, including screws or rods.

Figure 6:
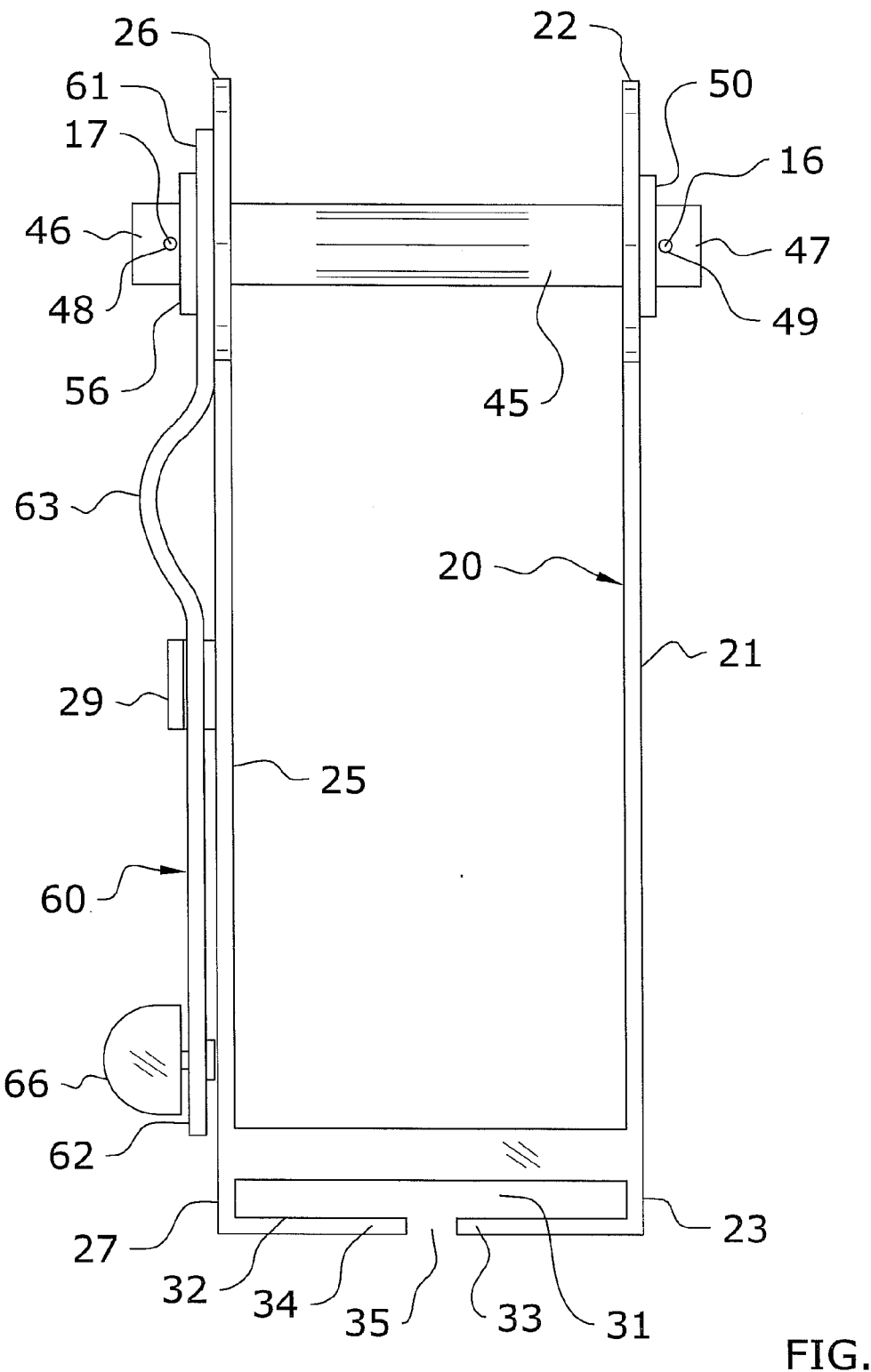
FIG. 6 is a front view of the present invention.

In a preferred embodiment, a first fastener 16 will extend through both the first aperture 43 of the first securing member 40 and the first aperture 48 of the second securing member 45. The apertures 43, 48 will generally be positioned at the respective first ends 41, 46 of the securing members 40, 45, which will generally extend out from the first locking member 50 as shown in FIG. 6.

In such a preferred embodiment, a second fastener 17 will extend through both the second aperture 44 of the first securing member 40 and the second aperture 49 of the second securing member 45. The apertures 44, 49 will generally be positioned at the respective second ends 42, 47 of the securing members 40, 45, which will generally extend out from the crank member 60 as shown in FIG. 6.

D. Locking Members

The present invention will generally include at least one locking member 50, 56 for securing and aligning the first securing member 40 and second securing member 45 with respect to each other to create a uniform second strap slot 38 through which an excess strap portion 14 may be inserted when the present invention is in use.

As shown in FIG. 2, the first locking member 50 will generally be comprised of a substantially round member which includes a first opening 52 and a second opening 54 separated by a divider. In a preferred embodiment, the first locking member 50 will be comprised of a double D-ring having a pair of D-shaped openings 52, 54. The first opening 52 of the first locking member 50 will generally be comprised of a D-shaped opening through which the first end 41 of the first securing member 40 may be inserted.

The second opening 54 of the first locking member 50 will generally be comprised of a second D-shaped opening which is oriented in an opposite configuration with respect to the first opening 52 as shown in FIG. 2. The first end 46 of the second securing member 45 will generally extend through the second opening 54 of the first locking member 50 when the present invention is assembled. It is appreciated that the first opening 52 and second opening 54 of the first locking member 50 may be comprised of various alternative configurations, so long as the openings 52, 54 are capable of securely and snugly receiving the first ends 41, 46 of the first and second securing members 40, 45.

The second locking member 56 will generally be comprised of a substantially round member which includes a first opening 58 and a second opening 59 separated by a divider. In a preferred embodiment, the second locking member 56 will be comprised of a double D-ring having a pair of D-shaped openings 58, 59. The first opening 58 of the first locking member 56 will generally be comprised of a D-shaped opening through which the second end 42 of the first securing member 40 may be inserted.

The second opening 59 of the second locking member 56 will generally be comprised of a second D-shaped opening which is oriented in an opposite configuration with respect to the first opening 58 as shown in FIG. 2. The second end 47 of the second securing member 45 will generally extend through the second opening 59 of the second locking member 56 when the present invention is assembled. It is appreciated that the first opening 58 and second opening 59 of the second locking member 56 may be comprised of various alternative configurations, so long as the openings 58, 59 are capable of securely and snugly receiving the second ends 42, 47 of the first and second securing members 40, 45.

E. Crank Member

The present invention will generally include a crank member 60 which is fixedly attached to both the first securing member 40 and the second securing member 45 of the present invention. The crank member 60 will generally be utilized to rotate the securing members 40, 45 with respect to the frame 20. Through rotation of the securing members 40, 45, the excess strap portion 14 which is positioned within the second strap slot 38 will be wound around the securing members 40, 45 and prevented from flapping around and causing damage.

Figure 7:
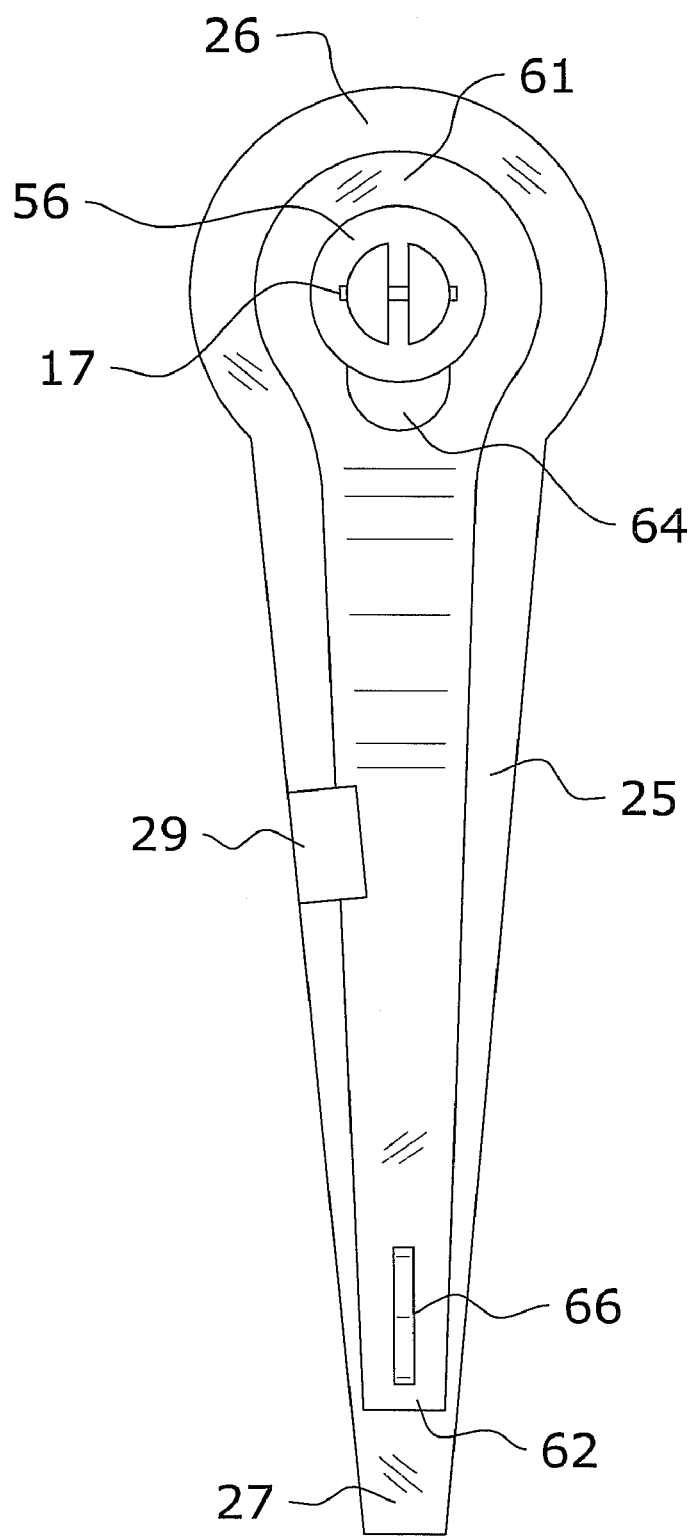
FIG. 7 is a first side view of the present invention.
Figure 8:
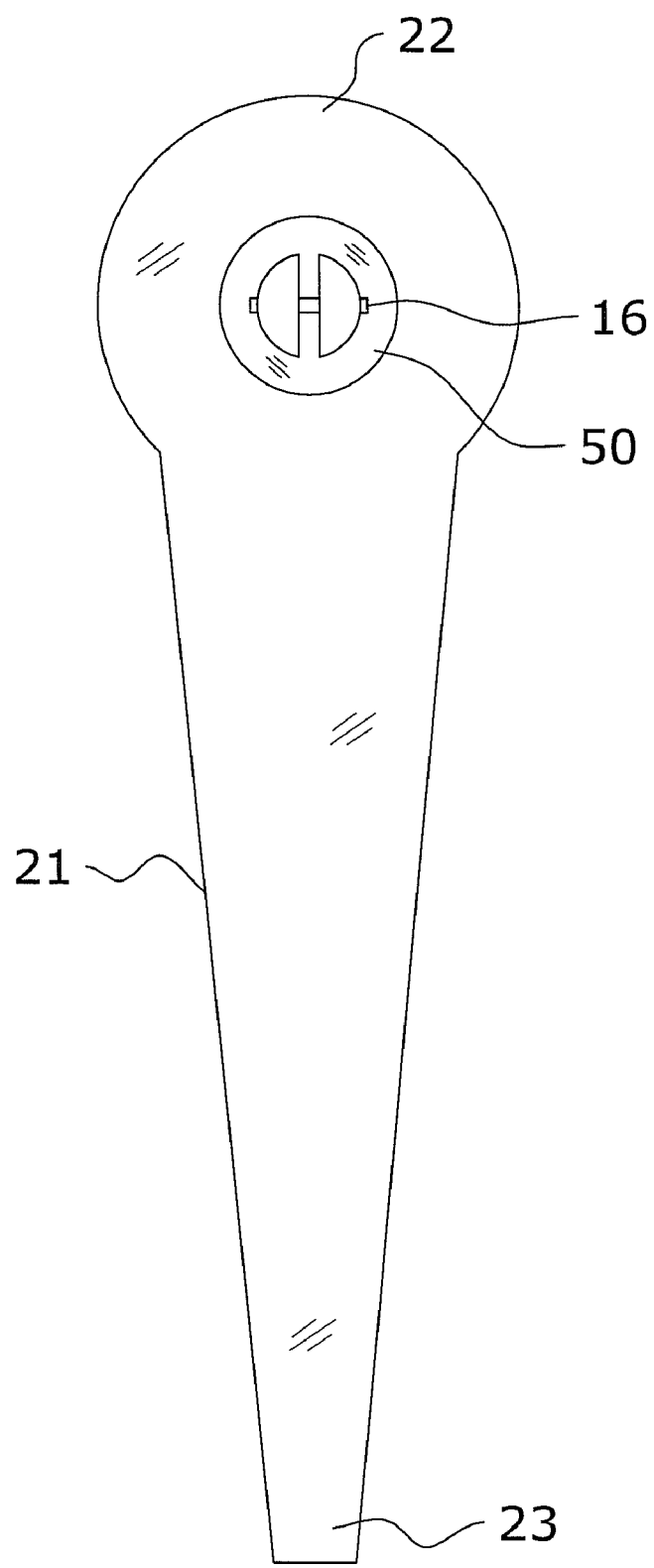
FIG. 8 is a second side view of the present invention.
Figure 9:
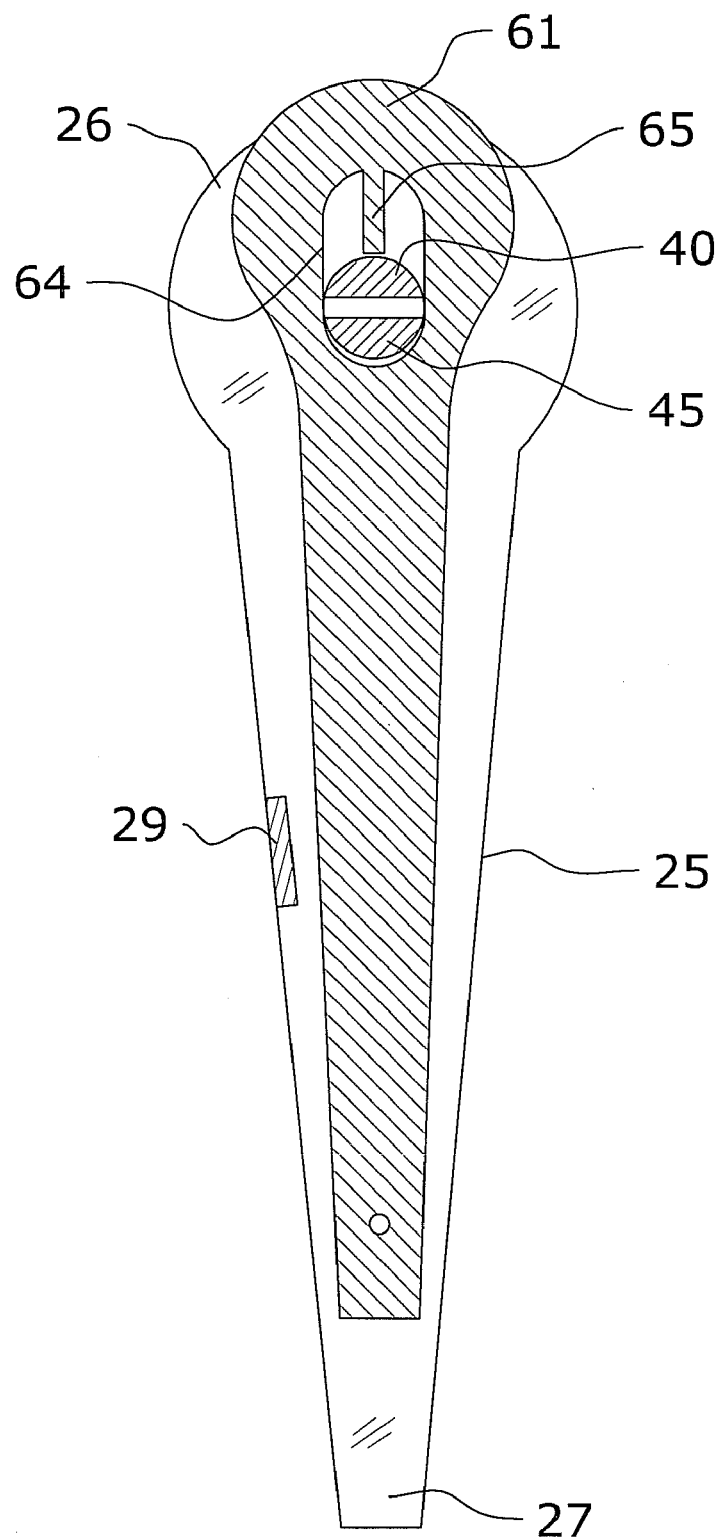
FIG. 9 is a side cutaway view of the present invention.

The crank member 60 of the present invention will generally be comprised of an elongated member having a first end 61 and a second end 62 as shown in FIG. 2. The first end 61, which will generally be comprised of the upper end of the crank member 60, will generally include an opening 64 for receiving the respective second ends 42, 47 of the first securing member 40 and second securing member 45 of the present invention. The opening 64 may be comprised of various configurations, but will generally include a clutch 65 extending within the opening 64. The clutch 65 will preferably be comprised of a downwardly-extending projection which partially bisects the opening 64. The clutch 40 will act to engage with the space between the first securing member 40 and the second securing member 45 which extends out of the first locking member 50 as shown in FIG. 7. When the clutch 40 is engaged with the first locking member 50, turning motion on the crank member 60 will be imparted to the securing members 40, 45, thus causing them to rotate within the frame 20. When the clutch 40 is disengaged from the first locking member 50 as shown in FIG. 9, the crank member 60 may freely rotate without imparting any motion to the securing members 40, 45.

The crank member 60 will generally include a bend portion 63 at the approximate midsection of its length as shown in FIG. 6. The bend portion 63, or the crank member 60 as a whole, may be comprised of a semi-flexible material so as to allow the crank member 60 to be drawn slightly away from the second member 25 of the frame 20 when the crank member 60 is needed to be rotated. When the crank member 60 is not in use, it will preferably rest against the outer face of the second member 25 and be held in place by the catch member 29 to prevent the crank member 60 from moving or rotating at undesirable times.

The crank member 60 will also generally include a knob 66 positioned at or near its second end 62 as shown in FIG. 7. The knob 66 may be fixedly attached to the crank member 60, but will preferably be rotatably attached to the crank member 60 to ease rotation of the crank member 60. The knob 66 may be comprised of various configurations, but will generally be comprised of a semi-circular projection which is rotatably attached to a position at or near the second end 62 of the crank member 60.

F. Operation of Preferred Embodiment

Figure 5:
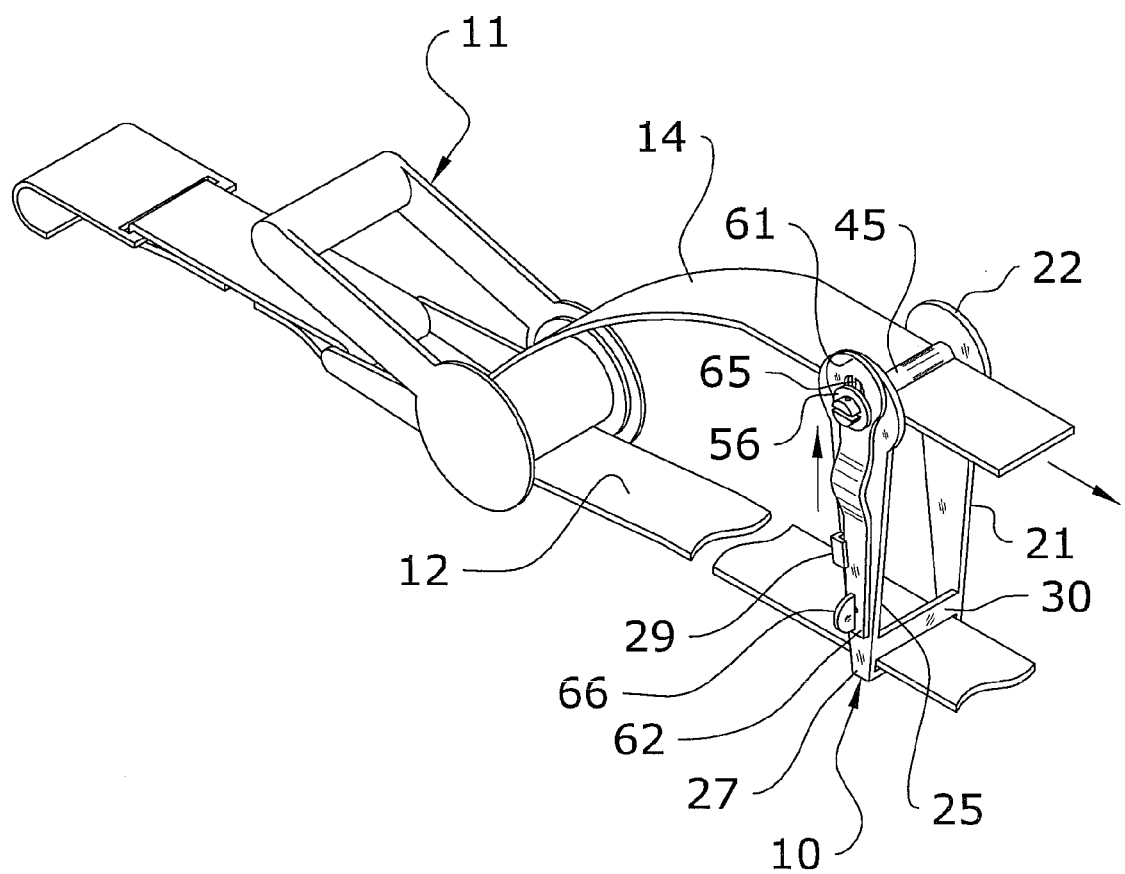
FIG. 5 is an upper perspective view of the present invention in use.

In use, a load of cargo (not shown) will generally be secured to a trailer or other structure by a ratchet fastener 11. When utilizing the ratchet fastener 11, a single strap will be extended around the cargo and tightened with the ratchet fastener 11, leaving a secured strap portion 12 which is secured firmly around the cargo by the ratchet fastener 11 and an excess strap portion 14 which extends loosely from the ratchet fastener 11 as shown in FIG. 5.

To prevent the excess strap portion 14 from flapping around and potentially causing damage to the trailer, load or strap itself, the excess strap portion 14 may be secured by the present invention. First, the secured strap portion 12 will be inserted into the first strap slot 31 near the lower end 23, 27 of the frame 20. Because there will likely not be a free end on the secured strap portion 12, it may be inserted into the first strap slot 31 through the gap 35 in the second connecting member 32.

After the secured strap portion 12 has been inserted into the first strap slot 31, the free end of the excess strap portion 14 may be inserted through the second strap slot 38, which is comprised of the slot created by the separation of the first securing member 40 and second securing member 45. After the excess strap portion 14 has been inserted through the second strap slot 38, the crank member 60 may be rotated in a first direction to wind the excess strap portion 14 around both securing members 40, 45 as shown in FIG. 4. With the excess strap portion 14 secured in the present invention, the crank member 60 may be rested against the second member 25 of the frame 20 and held in place by the catch member 29.

When it is desired to unload the cargo, the present invention may be removed by rotating the crank member 60 in a second direction, which will act to unwind the excess strap portion 14 from around the securing members 40, 45. The excess strap portion 14 may then be removed from the second strap slot 38 and the secured strap portion 12 may then be removed from the first strap slot 31. The present invention may then be stored for future use.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A strap securing device, comprising:
   a frame including a first member and a second member, wherein said first member is parallel with said second member;
   a first connecting member extending between a lower end of said first member and a lower end of said second member, wherein said first connecting member is perpendicular with said first member;
   a second connecting member extending between said first member and said second member, wherein said second connecting member is parallel with said first connecting member, wherein said second connecting member includes a gap;
   a first strap slot between said first connecting member and said second connecting member for receiving a secured strap portion from a ratchet fastener;
   a first opening positioned within an upper end of said first member;
   a second opening positioned within an upper end of said second member;
   a first securing member rotatably extending through said first opening and said second opening;
   a second securing member rotatably extending through said first opening and said second opening;
   a second strap slot between said first securing member and said second securing member for receiving an excess strap portion from a ratchet fastener;
   a first double D-ring connecting a first end of said first securing member to a first end of said second securing member, wherein said first double D-ring is positioned adjacent said first opening;
   a second double D-ring connecting a second end of said first securing member to a second end of said second securing member, wherein said second double D-ring is positioned adjacent said second opening;
   a crank member selectively engaged with said first securing member and said second securing member, wherein said crank member includes a crank opening, wherein said first securing member and said second securing member each extend through said crank opening, wherein said crank opening includes a clutch member, wherein said clutch member is adapted to selectively engage with said first securing member and said second securing member such that rotational motion of said crank member causes said first securing member and said securing member to rotate within said first and second openings, wherein said crank member includes a bend portion;
a knob attached to said crank member; and
a catch member attached to said first member for selectively engaging with said crank member.

* * * * *